United States Patent [19]

McCaughan et al.

[11] Patent Number: 5,227,913

[45] Date of Patent: Jul. 13, 1993

[54] CO-DEPOSITION OF ERBIUM AND TITANIUM INTO LITHIUM NIOBATE AND OPTICAL AMPLIFIER PRODUCED THEREBY

[75] Inventors: Leon McCaughan; Douglas M. Gill, both of Madison, Wis.

[73] Assignee: Wisconsin Alumni Research Foundation, Madison, Wis.

[21] Appl. No.: 756,565

[22] Filed: Sep. 11, 1991

[51] Int. Cl.$^5$ .......................... G02B 6/26; H01S 3/094
[52] U.S. Cl. ..................................... 359/341; 359/343; 385/1; 385/141
[58] Field of Search ............... 359/160, 179, 341, 343; 385/1, 141

[56] References Cited

U.S. PATENT DOCUMENTS

| | | | |
|---|---|---|---|
| 3,607,752 | 9/1971 | Graenicher | 252/62.9 |
| 3,799,642 | 3/1974 | Phillips et al. | 350/3.5 |
| 3,932,299 | 1/1976 | Phillips | 252/300 |
| 4,778,234 | 10/1988 | Papuchon et al. | 350/96.12 |
| 4,840,816 | 6/1989 | Appleton et al. | 427/38 |
| 4,847,850 | 7/1989 | Kafka et al. | 372/71 |
| 4,923,279 | 5/1990 | Ainslie et al. | 350/96.30 |
| 4,946,240 | 8/1990 | Yamamoto et al. | 350/96.19 |
| 4,953,943 | 9/1990 | Miyazaki et al. | 350/96.12 |
| 4,961,618 | 10/1990 | Jordan et al. | 350/96.12 |
| 4,962,995 | 10/1990 | Andrews et al. | 350/96.34 |
| 4,963,832 | 10/1990 | Desurvire et al. | 330/4.3 |
| 4,995,046 | 2/1991 | Fan et al. | 372/41 |
| 5,005,175 | 4/1991 | Desurvire et al. | 372/6 |
| 5,007,698 | 4/1991 | Sasaki et al. | 350/96.15 |
| 5,037,181 | 8/1991 | Byer et al. | 385/144 |
| 5,039,190 | 8/1991 | Blonder | 359/341 |
| 5,077,087 | 12/1991 | Byer et al. | 427/163 |
| 5,128,948 | 7/1992 | Papuchon et al. | 372/21 |
| 5,174,876 | 12/1992 | Buchal et al. | 427/526 |

FOREIGN PATENT DOCUMENTS 178815 9/1985 European Pat. Off. .
433859 6/1991 European Pat. Off. .
3228605 7/1982 Fed. Rep. of Germany .

OTHER PUBLICATIONS

Brinkmann et al, Proc. SPIE, Nov. 2, 1990, vol. 1362, Pt. 1, pp. 377-382; abst. only supplied.

Helmfrid et al, IEEE Photonics Tech. Lett., vol. 3, #7, pp. 635-637, Jul. 1991; abst. only supplied.

Buchal et al, Surf. Chem & Beam Solid Interac. Symp., Nov. 29, 1990, pp. 307-312; abst. only supplied.

Gill et al, IEEE J.Q.E., vol. 27, #3, pp. 588-592, Mar. 1991; abst. only provided.

E. Lallier, "Laser oscillation of a single mode channel waveguide in Nd:MgO:LiNbO$_3$," *Electron. Lett.*, 25, 1491 (1989).

R. J. Mears, L. Reekie, J. M. Jauncey, and D. N. Payne, "Low-Noise Erbium-Doped Fibre Amplifier Operating at 1.54 um," *Electron. Lett.* 23, 1026 (1987).

E. Desurvire, J. R. Simpson, and P. C. Becker, "High-gain Erbium-Doped Travelling-Wave Fiber Amplifier," *Opt. Lett.*, 12, 888 (1987).

R. Brinkman et al., "Annealed Erbium-implanted single-mode LiNbO$_3$ waveguides," presented as a post-deadline paper at the Integrated Photonics Conference, Hilton Head, USA, paper PD1-1 (Mar. 26, 1990).

N. Agrawal and L. McCaughan, "Low-Loss Ti:LiNbO$_3$ Intersecting Wave guides," *Appl. Phys. Lett.*, 54, 1669 (1989).

S. Helmfrid et al., "Stimulated Emission in Er:ti:LiNbO$_3$ Channel Waveguides Close to 1.53 um transition," *Electron Lett.*, 27, 913 (May, 1991).

Primary Examiner—Nelson Moskowitz
Attorney, Agent, or Firm—Olson & Hierl, Ltd.

[57] ABSTRACT

Er and Ti are co-diffused under controlled conditions into a single crystal of LiNbO$_3$. The co-diffusion is used to produce a light amplifier in LiNbO$_3$ that is suitable for use in integrated optic devices.

11 Claims, 5 Drawing Sheets

CO-DEPOSITION OF ERBIUM AND TITANIUM INTO LITHIUM NIOBATE AND OPTICAL AMPLIFIER PRODUCED THEREBY

FIELD OF THE INVENTION

This invention relates to the co-diffusing of titanium (Ti) and erbium (Er) into single crystal lithium niobate (LiNbO$_3$) and to guided wave integrated optical devices, especially optical amplifiers, produced thereby.

BACKGROUND OF THE INVENTION

A light waveguide in a single crystal of LiNbO$_3$ doped with Ti is prepared by placing a thin layer of Ti on the surface of the LiNbO$_3$ and heating to cause the Ti to diffuse into the LiNbO$_3$ substrate. A Ti-rich channel penetrating several microns below the LiNbO$_3$ surface results which provides a light waveguide.

Although many different optical operations with integrated optics can be performed in a single LiNbO$_3$ substrate, such as optical modulation, switching, polarization rotation, wavelength multiplexing, and the like, the optical operation of amplification has heretofore not been achieved in such an integrated substrate.

Optical gain (or amplification) has been demonstrated using Nd-doped LiNbO$_3$ grown from a melt (Nd:LiNbO$_3$). Also, efforts are underway to grow Er:LiNbO$_3$ for optical amplification at a wavelength of about 1500 nm (a useful wavelength for fiber optic telecommunications). However, such methods and devices are not suitable for integrated optics because of the inherent absorption losses that occur in a uniformly doped substrate.

A technique is needed by which a single crystal of LiNbO$_3$ can be treated to produce therein a spatially localized absorbing integrated optical device, particularly a light amplifier.

SUMMARY OF THE INVENTION

The present invention is directed to a method for co-diffusing titanium (Ti) and erbium (Er) into single crystal lithium niobate (LiNbO$_3$), and to selectively light absorbing integrated optic devices, especially optical amplifiers, which are produced by such co-diffusion.

Using this method, rapid diffusion of Er and Ti into the substrate, LiNbO$_3$, crystal structure is achieved. Attempts to diffuse Er alone into LiNbO$_3$ have previously been generally unsuccessful because of the very slow movement of Er into LiNbO$_3$.

According to the present method, a region along a passive, waveguide supporting signal light in LiNbO$_3$ is selectively doped (or infused) with Er, and also, if desired, a pathway to the region is provided for input of a pump light. The pump light excites the Er so that the region amplifies the signal light passing therethrough. Thus, an optical amplifier is provided that is suitable for incorporation into a monolithic single crystal LiNbO$_3$-based integrated optic device.

The inventive co-diffusing method utilizes the steps of co-depositing Er and Ti upon one face of single crystal LiNbO$_3$ followed by heating.

With suitable added reflecting means, an optical amplifier of this invention can function as a laser (that is, as a generator of light having a wavelength in a given range).

Other and further objects, advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure.

DETAILED DESCRIPTION

(a) General

Figure 1A:
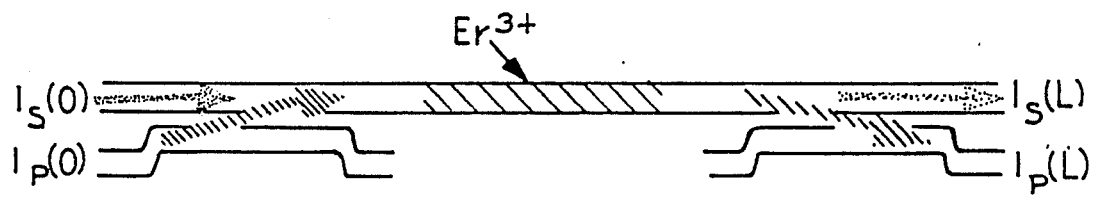
FIGS. 1A, 1B, 1C and D are schematic diagrams of different optical amplifiers according to this invention.

The term "signal light" has reference herein to a light having a wavelength in a given range that is modulatable with information and that is being transferred over or through a communications system by optical means.

The term "pump light" has reference herein to light that has a wavelength shorter than the signal light wavelength and which has the capacity, after introduction into a single crystal of LiNbO$_3$ that has been co-diffused with Ti and Er, to excite the Er therein.

The term "single crystal LiNbO$_3$" or equivalent refers to a substrate body which is comprised of single crystalline LiNbO$_3$ and which may contain minor (very small) amounts of entrained polycrystalline LiNbO$_3$ (the amount of which, and the location of which, is presently unknown).

The term "co-deposition" as used herein refers to the deposition of Er and Ti on a surface of a single crystal LiNbO$_3$ whether the Er and the Ti are deposited successively or concurrently.

Although guided wave integrated optics using single crystal LiNbO$_3$ have made possible the most advanced optical circuits now known, this technology lacks the ability to produce or to amplify light.

It has now been discovered that co-diffusion of Ti with Er into a single crystal of LiNbO$_3$ dramatically increases the Er diffusion coefficient (in an amount that is substantially greater than about 30 times). The Ti thus serves two functions: to promote the incorporation of Er into LiNbO$_3$ and to locally raise the refractive index of LiNbO$_3$ so as to make an optical waveguide (i.e., a light path or channel) in single crystal LiNbO$_3$.

Er is known to have a strong emission peak at about 1500 nm which is a wavelength of importance for telecommunications systems. Er has selective light absorbing effects in LiNbO$_3$. Er in a diffused state in LiNbO$_3$ is optically pumped or excited by illuminating it with light at a wavelength shorter than 1500 nm. In accord with this invention, it has been determined that when a signal light which has a wavelength somewhat greater than about 1500 nm passes through a region that is infused with Er and Ti (as described herein) and that is excited with such a pump light, energy is then transferred from the pump light to the signal light and the signal light is amplified as a result.

(b) Method—General

In accord with present invention, erbium and titanium are co-diffused into single crystal lithium niobate by a method comprising the steps of:

(a) co-depositing erbium and titanium on one face of said lithium niobate crystal; and (b) heating the resulting crystal at a temperature in the range of about 800 to about 1250 degrees C. for about 5 to about 80 hours.

Although an Er layer (or film) does not appear to adhere well to the surface of single crystal of LiNbO$_3$, when an Er layer is overcoated with a Ti layer, or the single crystal is first overcoated with Ti, then both metal layers adhere well.

The Er and the Ti can be deposited simultaneously, if desired. A suitable mole ratio of Er to Ti is believed to be the range of about 1:12 and a suitable thickness is in the range of about 20 to about 150 nm.

Alternatively, the Er and the Ti can be deposited as successive layers upon one face of single crystal LiNbO$_3$. Preferably, the Er layer is deposited before the Ti layer. The Er layer can be conveniently in the thickness range of about 5 to about 50 nm (preferably about 10 to about 30 nm) and the Ti layer can be conveniently in the thickness range of about 80 to about 200 nm (preferably about 90 to about 150 nm).

Deposition of Er and/or Ti can be accomplished by any convenient method, as those skilled in the art will appreciate. However, it is presently preferred to accomplish deposition of each of Er and Ti by sputtering under vacuum, preferably, onto a polished surface of single crystal LiNbO$_3$. A suitable vacuum for sputtering is in the range of about $10^{-2}$ to about $10^{-11}$ torr. A present preference is to employ the sputtering equipment that is available commercially from Iontek, Inc. of Fort Collins, Colorado and the sputtering conditions recommended by the company for use with their equipment.

Preferably, a sputter deposition procedure uses an ionized gas which has been accelerated under an electric or magnetic field to bombard the Er or Ti source target, thereby "knocking off" Er or Ti atoms which drift to and stick to a spatially adjacent single crystal LiNbO$_3$ substrate.

Sputtering is thus distinguishable from thermal evaporation, electron beam evaporation, and the like because the Er or Ti source target in such methods is treated to "boil off" the Er or Ti.

When the Ti is applied as a separate layer, it is presently preferred that the Ti be deposited over an Er layer without breaking the vacuum used to deposit the Er layer.

After the Er and the Ti have been so co-deposited, the resulting layered LiNbO$_3$ substrate is heated in a furnace. Preferably, the furnace has an inert or oxygen containing atmosphere. A suitable oxygen containing atmosphere comprises, for example, oxygen or a mixture of oxygen and water vapor (preferably the latter) as further described herein.

In general, heating is carried out for a time in the range of about 5 to about 80 hours (preferably about 10 to about 25 hours) at a temperature in the range of about 800 to about 1250 degrees C. (preferably about 1050 degrees C.). It is presently believed that longer diffusion times using such temperatures tend to produce deeper diffusion of Er into a single crystal LiNbO$_3$ substrate from the application surface. An atmospheric gas pressure can be maintained in the furnace using a gas flow rate which can be, for example, about 2 liters per minute or otherwise, if desired.

When a diffusion time in excess of about 10 hours is employed, it is presently preferred to diffuse a second layer of Ti into the LiNbO$_3$ substrate in order to achieve greater confinement of signal light in the resulting waveguide region formed by the diffused Ti in the LiNbO$_3$ substrate.

This second Ti diffusion procedure is conveniently accomplished by terminating the heating and replacing the treated single crystal LiNbO$_3$ in the deposition chamber where a layer composed of Ti is deposited on the same previously coated surface of the single crystal LiNbO$_3$. Any convenient deposition procedure can be used, but preferably a sputtering procedure such as above described is used. The thickness of the Ti layer can range from about 30 to about 200 nm with the presently preferred thickness being in the range of about 90 to about 120 nm. Thereafter, the treated single crystal LiNbO$_3$ is replaced in the furnace and heating is continued within the temperature range indicated above for a total heating time which is not more than about 40 hours.

The LiNbO$_3$ substrate which results at the end of the heating step has the Ti and the Er diffused thereinto.

The method of this invention can be employed to produce optical operations which are selectively absorbing in an integrated optic device existing in single crystal LiNbO$_3$. Usually, the method is practiced as part of a device preparation procedure wherein regions of single crystal LiNbO$_3$ are undergoing a diffusion procedure, as those skilled in the art will appreciate.

Of course, for device formation purposes, the surface area of the LiNbO$_3$ wherein the Er and the Ti are deposited in accordance with this invention is characteristically localized or contained, and is positioned precisely, as further described and illustrated herein.

It is a distinct feature and advantage of this invention that the present method can be practiced in combination with the various conventional prior art photolithographic techniques that have been previously employed in the manufacture of integrated optic devices.

(c) Devices

The method of this invention is particularly well suited for utilization in the manufacture of optical amplifiers for light having a wavelength in a given range particularly for use as an integrable optic device, such an amplifier incorporates a crystal of lithium niobate in which a region exists that is adjacent one face thereof. In this region a traveling signal light having a wavelength in the given range can travel in overlapping relationship to a pump light having a wavelength that is less than about the given range.

This region is co-diffused with erbium and titanium. The quantity and the distribution of the titanium therein is sufficient to define a light path, and the quantity and the distribution of the erbium therein is sufficient to cause selective light absorption of the pump light in this light path.

The amplifier includes both means for inputting the signal light into the light path and also means for outputting the signal light from the light path. Also, the amplifier includes means for inputting the pump light into the light path and for overlapping the pump light relative to the signal light in the light path.

The interrelation between the components is such that, when the signal light and pump light are each input into the light path, the signal light is amplified before it leaves the light path.

The wavelength of the traveling signal light is characteristically in the range of about 1520 to about 1560 nm for a single crystal of lithium niobate, and the wavelength of the pump light is characteristically less than about 1520 nm. A present preference is for the signal light to have wavelength of 1540±10 nm and for the pump light to have a wavelength in the range of about 400 to about 1490 nm and more preferably in the range of about 1460 to about 1480 nm.

The means for inputting the signal light is preferably positioned at a first location that is adjacent one end of the light path, and the means for outputting the signal light is preferably positioned at a second location that is also adjacent the light path and that is in a longitudinally spaced relationship to the first location relative to the direction of travel of the signal light in the light path.

The means for inputting and so overlapping the pump light into the light path is preferably positioned at a third location that is adjacent to the first location. Preferably, means for separating residual portions of the pump light from the resulting signal light is also provided. The separating means is positioned at a fourth location that is in adjacent relationship to the second location, and the signal light is preferably separated from the residual pump light as the signal light leaves the light path or co-diffused region.

The region, if desired, can be elongated relative to its adjacent face. Within limits, the length of the light path in the region now appears to be proportional to the amount of signal light amplification achieved for a particular pump light.

In general, the means for inputting and for outputting, and the means for separating the pumped light from the signal light, if employed, need have no special structure since various means can be used. If desired, for example, opposite end portions of the region can be cut and polished for abutting interconnection with inputting and outputting wave guide means for the signal light. The pump light similarly can be directly input into the region at a polished location. For example, the pump light can be input perpendicularly, if desired, into the region through the adjacent crystal face. However, it is presently preferred that the region be integrally associated with waveguide means which accomplish such inputting, outputting and (preferably employed) separating functions.

Referring to FIGS. 1A through 1D, there is seen the schematic diagrams of four waveguide geometries of optical amplifier embodiments of the present invention which employ waveguides that are in functional association with the amplifying region. In each Figure, $I_s$ is the optical signal to be amplified and $I_p$ is the optical pump which provides the amplifying energy.

As can be seen from FIGS. 1A, 1B, 1C and 1D, a light amplifier of this invention characteristically employs a substrate body comprised of a single crystal of lithium niobate ($LiNbO_3$).

Formed in the substrate body of each embodiment are waveguides of the type which can result from titanium diffusion from one adjacent crystal surface into the substrate body.

Figure 1B:
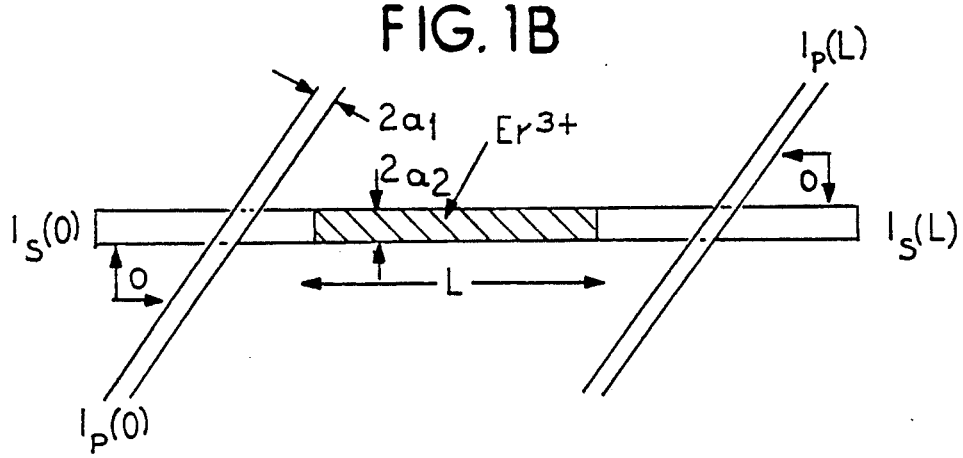
Figure 1C:
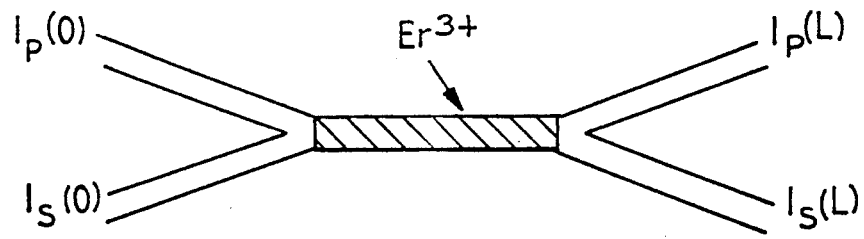
Figure 1D:
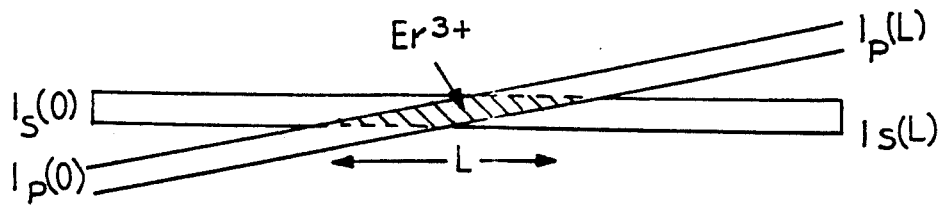

In, for example, the case of each of the embodiments of FIGS. 1B, 1C and 1D, two waveguides intersect either at or before and after, a predetermined region that is indicated as Er. Each intersection like the region itself, can have various configurations (or geometries), as indicated in the FIGS. 1A–1D. Preferably, the width of a region is smaller than the length. From these Figures the structural details of each embodiment are believed to be apparent, so that no detailed description of each embodiment is desirable or necessary.

Both Ti and Er are diffused into the predetermined region (preferably using methodology such as that described herein).

In each device, a signal light is input into a first waveguide at a frequency in the range indicated above and a pump light is input into a second waveguide at a frequency in the range as indicated above. In the amplification region, the signal light traveling therethrough is amplified in wave amplitude (with no change in frequency) by an energy transfer from the pump light.

(d) Device Production

To produce an integrated optic device (such as a laser light amplifier) by the method of this invention, a surface of a single crystal $LiNbO_3$ is coated with a layer of a conventional photoresist composition, such as, for example, is commercially available from the Shipley Company of Newton, MA.

The crystal surface is then covered by a conventional EBES (electron beam exposure system) mask or the like. The mask is characteristically opaque except for thin stripes or slots arranged at predetermined locations. Ultraviolet light is impinged against the mask to image the photoresist layer in the slotted area(s). The resulting imaged layer is then contacted with a conventional developer solution. After development, the slotted imaged area(s) are exposed on the $LiNbO_3$ surface while the adjacent areas remain covered by a layered deposit of developed photoresist material.

Next, in a presently preferred procedure, a layer of Er which is, for example, about 12 nm thick is deposited (preferably using the above indicated sputtering procedure). Thereafter, without breaking vacuum, a layer of Ti which is, for example, about 100 nm thick is deposited (preferably using the above indicated sputtering procedure).

The resulting Er and Ti coated substrate crystal is then removed from the deposition chamber and placed in a solution which removes the layered deposit of photoresist composition but leaves the deposited Er and Ti on the crystal surface. The two-layered deposit of Er and Ti is retained on the resulting surface of the $LiNbO_3$ crystal.

Preferably after air drying, the resulting layered $LiNbO_3$ crystal is placed in a furnace for heating and diffusion, as indicated above. A present preference is to employ a furnace comprising a quartz tube having an inside diameter of about 4 inches which is externally surrounded by electrical heating elements. A gas comprising oxygen as above characterized is admitted and the furnace chamber is purged.

The water vapor is introduced into the $O_2$ by dripping water (at about 200 ml per hr.) into a heated glass chamber (about 105 degrees C.) which has the oxygen flowing through it before the oxygen is circulated through the quartz tube. A suitable gas circulation rate through this tube is about 2 liters per minute, and a suitable gas pressure in this tube is atmospheric.

The layered $LiNbO_3$ crystal is heated in this tube at temperatures and for times as indicated above. The resulting crystal is said to be co-diffused in areas thereof which are treated with Ti and Er.

After heating, the resulting $LiNbO_3$ crystal is removed from the furnace and the opposite ends thereof (in the case of a single elongated strip or zone of co-diffused structure) are cut and polished to provide parts for laser light to be coupled into, or out of, the waveguide ends.

(e) Optical Properties

The Er diffused $LiNbO_3$ is observed to emit green light when illuminated by red light of about 650 nm. This is theorized (and there is no intent herein to be bound by theory) to be due to excited state energy transfer. The effect is observed in both bulk grown and co-diffused $LiNbO_3$ prepared according to this invention.

Fluorescence spectra of both bulk (0.6 mol percent) and co-diffused Er:Ti:$LiNbO_3$ demonstrate that the ionization state of the rare earth element is $Er^{3+}$. Selective excitation ($^4S_{3/2} \rightarrow {}^4I_{15/2}$) fluorescence scans of both co-diffused and bulk-doped samples of Er:$LiNbO_3$ have nearly identical spectra as shown in FIGS. 2A and 2B.

Figure 2A:
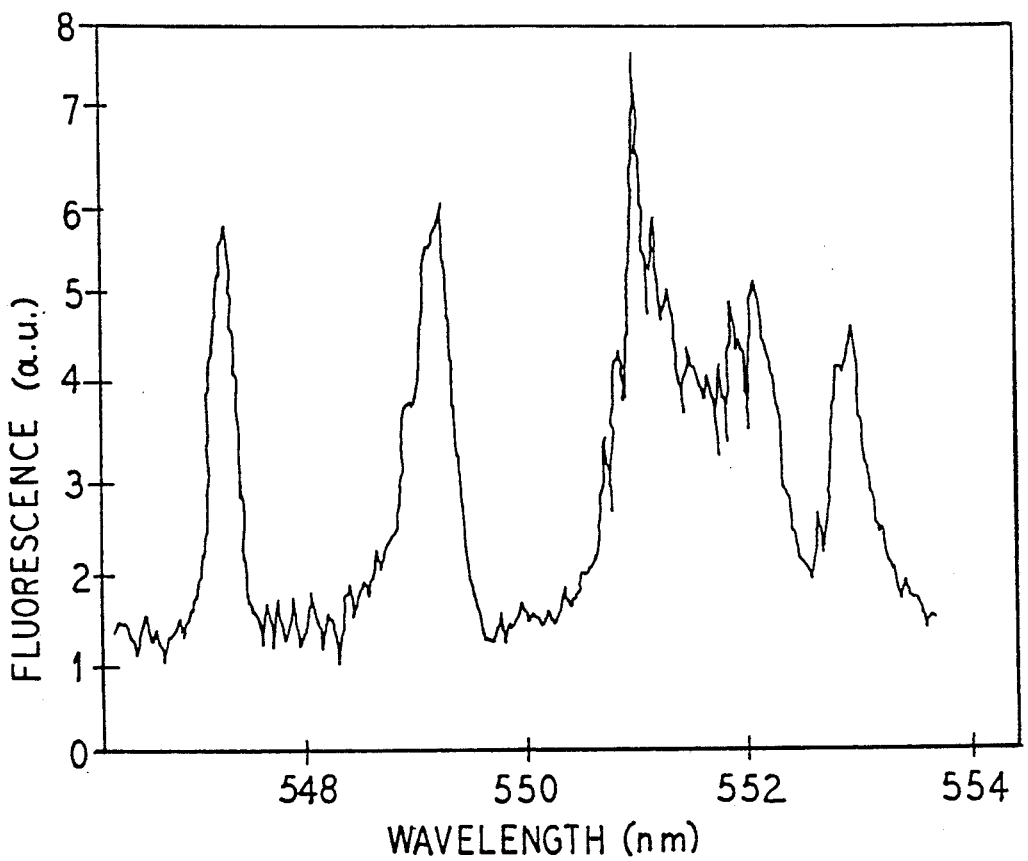
FIGS. 2A and 2B are plots showing the relationship between excitation wavelength (in nm) and fluorescence (in a.u.) with FIG. 2A being derived from a single crystal of LiNbO$_3$ co-diffused with Er and Ti as described herein and FIG. 2B being derived from bulk doped single crystal Er:LiNbO$_3$.
Figure 2B:
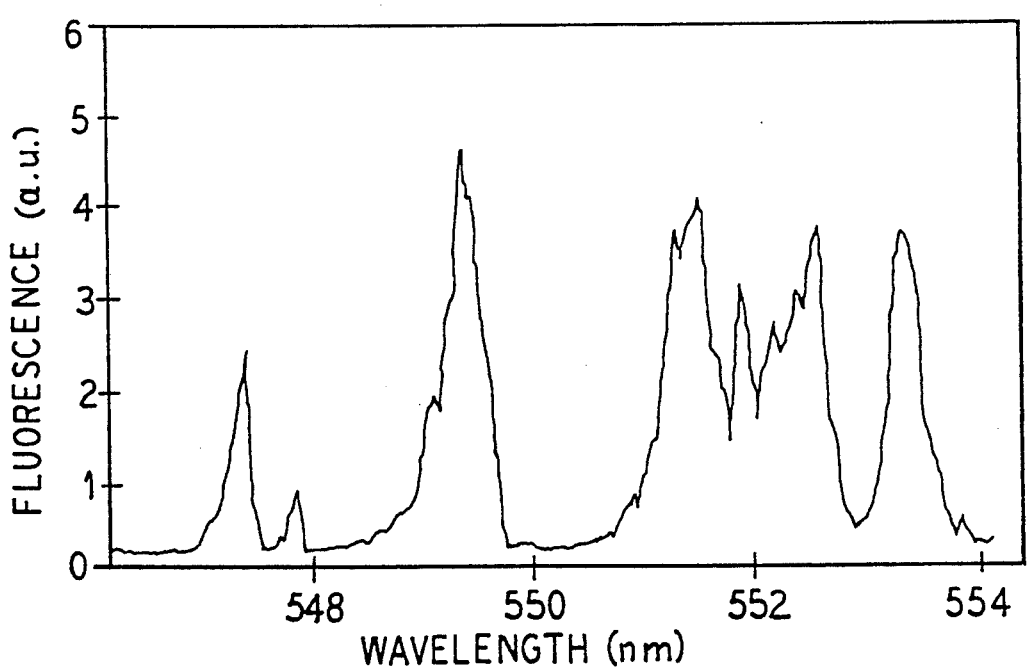

In the case of the work for which the results are shown in FIG. 2B, the surface of z-cut $LiNbO_3$ was sputter coated with 30 nm Er followed by sputter coating with 200 nm of Ti without breaking vacuum between the depositions. The resulting coated substrate was then heated to 1050 degrees C. for 20 hours in flowing oxygen and water vapor. Fluorescence spectra (FIG. 2B) was measured by illuminating the sample with light at 453 nm (from a dye laser) and measuring the re-emitted light (fluorescence) over the range of 546 nm to 554 nm.

Also with regard to FIG. 2B, a bulk doped sample (containing 0.6 mole percent) of Er-doped $LiNbO_3$ was measured by same method that was employed in producing the results shown in FIG. 2A. The strong similarity between the two curves (that is, the curve of FIG. 2A and the curve of FIG. 2B) indicates that the Er in the co-diffused sample (FIG. 2A) occupies the same lattice site or sites as exist in the bulk-doped sample (FIG. 2B).

In place of Ti or Er, co-diffusants can be used (which need not but could display waveguide forming capacity). Examples include chromium (Cr), zinc (Zn), and the like.

In place of or in addition to Er, other rare earths could be employed which may each fluoresce at a different wavelength, as shown in Table I below:

TABLE I

| Rare Earth | May fluoresce at (nm) |
| --- | --- |
| holmium (Ho) | 1300 or 1500[3] |
| neodymium (Nd) | 1060 |
| praseodymium (Pr) | 1300[3] |
| thulium (Tm)[1] | 1900[4] |

TABLE I-continued

| Rare Earth | May fluoresce at (nm) |
| --- | --- |
| ytterbium (Yb)[2] | — |

Table I footnotes:
[1] Absorbs light at 800 nm where inexpensive GaAs laser diodes produce light.
[2] Absorbs light efficiently from (pump) 800 nm diode lasers and transfers light efficiently to Er to emit at about 1500 nm.
[3] These wavelengths are important for telecommunications.
[4] There are not many laser sources at this wavelength.

The rare earth infused in accord with teachings of this invention may either produce amplification at some wavelength or absorb energy from the pump light and pass that energy on to a second rare earth. Such an energy transfer is important because not all desirable pump light wavelengths can be either cheaply or efficiently produced.

Preferably, in an amplifier of this invention, the length of the light path is such that the signal light is amplified to a predetermined extent.

Also, in presently preferred amplifiers of this invention, the titanium is diffused into the crystal from the face to a depth in the range of about 5 to about 15 microns, and the erbium is diffused into the crystal from the face to a depth that is in the range of about 2 to about 10 microns. In addition, the erbium is substantially completely confined to a domain that is within the domain occupied by the titanium and that is smaller in volume than the volume of the domain occupied by the titanium at any given transverse sectional location taken across the region.

It is theorized that the fluorescing fraction of the diffused Er is most likely being incorporated at the same site in each of the co-diffused and the bulk-doped samples because of the strong sensitivity of line splittings and level shifts to crystal fields (see FIGS. 2A and 2B).

The fluorescence peak of interest for optical amplification and lasing is observed to be at about 1540 nm in both the co-diffused and bulk-doped $LiNbO_3$. This emission wavelength of about 1540 nm is different from that observed in glass fiber (which is 1530 nm). The fluorescence lifetime of this ($^4S_{3/2} \rightarrow {}^4I_{15/2}$) transition is found to be 7 milliseconds (ms), and this lifetime is about the same in both the co-diffused and the bulk sample material.

Figure 3:
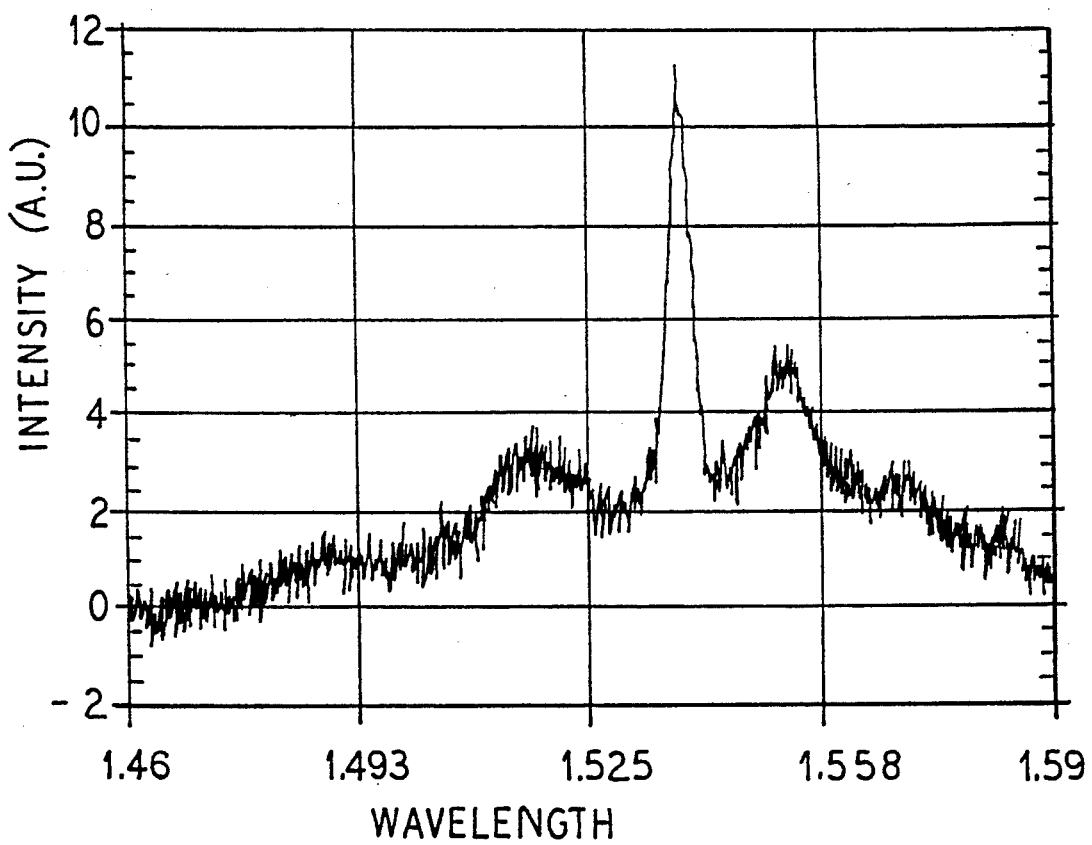
FIG. 3 shows the fluorescence spectrum of a waveguide in a single crystal of LiNbO$_3$ produced by co-diffusion of Er and Ti as described herein (wavelength in nm versus fluorescence in a.u.) that is optically pumped at about 650 nm.

A waveguide is prepared in single crystal $LiNbO_3$ by diffusion of Er and Ti thereinto as described herein and measurements similar to those above described in reference to FIGS. 2A and 2B are carried out at the output. The spectral distribution shown in FIG. 3 is observed. The spectral peak at about 1540 nm shows the wavelength at which the waveguide carries traveling signal light.

(f) Diffusion Effects

Er concentration distributions for the purpose of better characterizing devices of this invention were determined by electron microprobe and neutron activation analysis of step etched (by ion milling) and angle polished (1:100::rise:run) samples. Depth calibration and curvature correction on angle-milled samples were made with an interference microscope.

Figure 4A:
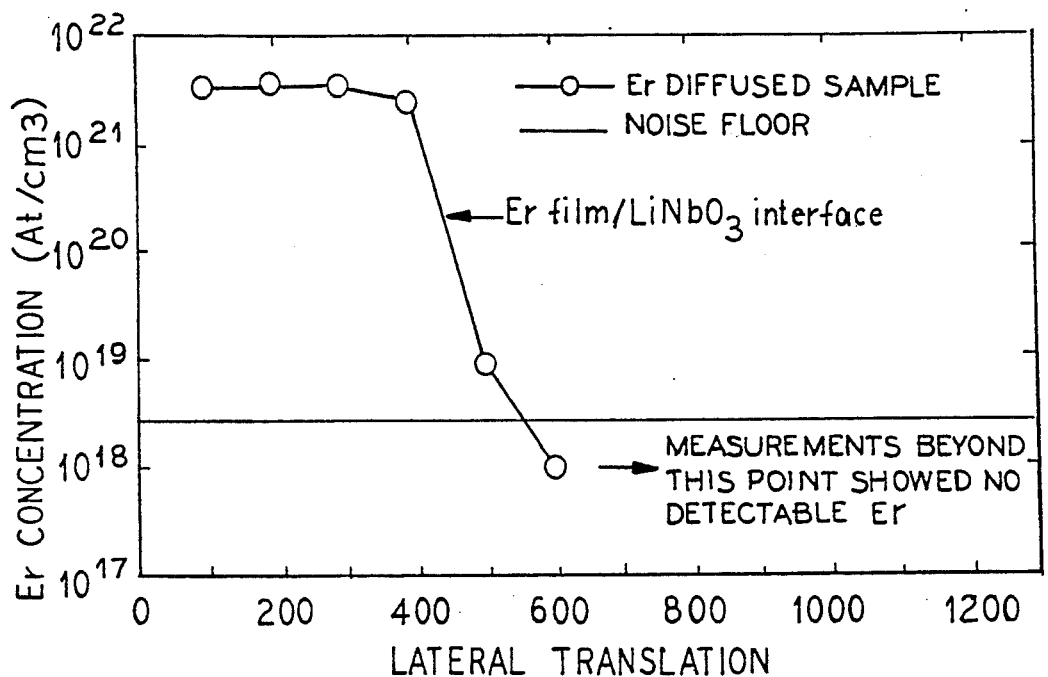
FIGS. 4A and 4B are plots of electron microprobe measurements from angle milled LiNbO$_3$ with FIG. 4A showing results of a thin film of Er and with FIG. 4B showing results of two thin layers of Er and Ti.

Referring to FIG. 4A, concentration profiles of the Er-only diffused samples show that the rare earth element Er is essentially confined to a thin film at the surface.

Figure 4B:
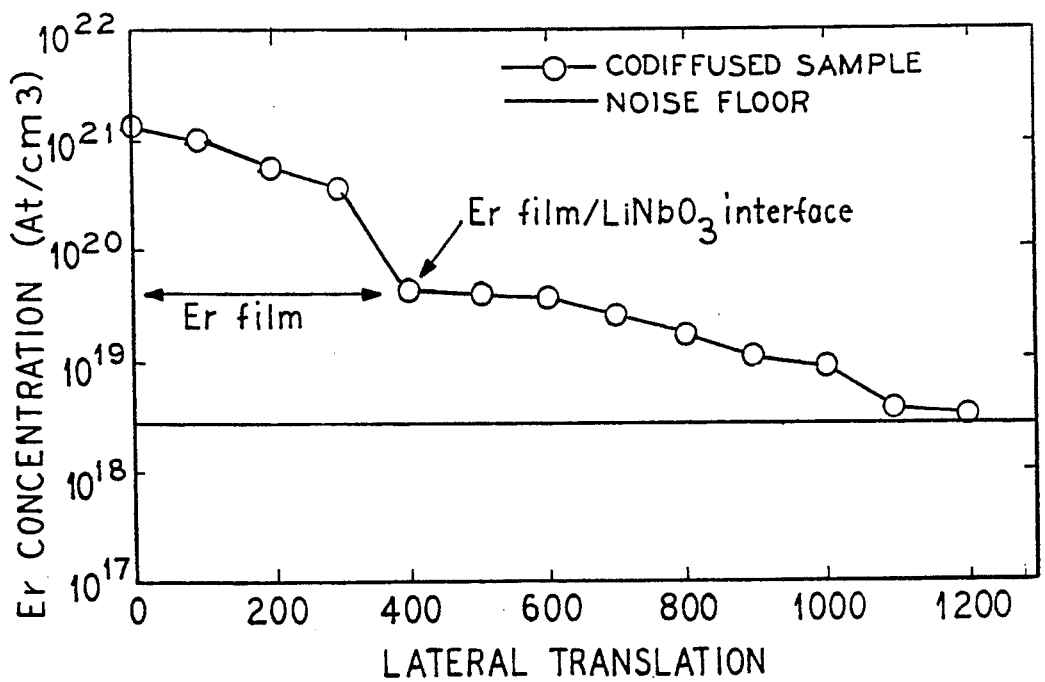

With regard to FIG. 4B, the co-diffused (Er+Ti) sample shows the same thin source layer of high Er concentration (about $10^{21}$ cm$^{-3}$) plus a broad diffusion tail beginning with a concentration of approximately $5 \times 10^{19}$ cm$^{-3}$ and decaying to a $e^{-1}$ depth of about 5 μm.

Figure 5:
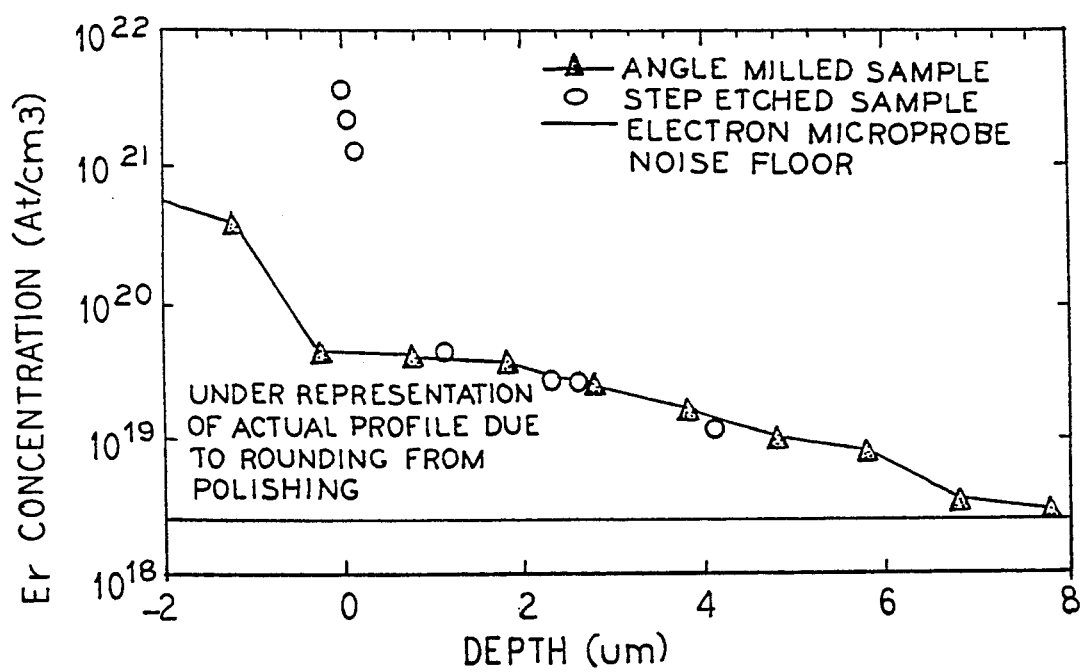
FIG. 5 shows a plotted comparison between depth in $\mu$m and Er concentration in At/cm$^3$ for electron microprobe results from co-diffused Er:Ti:LiNbO$_3$ (shown as solid triangles) measurements on an angle milled crystal substrate as in FIG. 1B and for results from the same material using a step etched (by ion milling) substrate (shown as open circles)

In each of FIGS. 4A and 4B, the samples were heated to 1050 degrees C. for 20 hours in $O_2$ and then milled at a 1:100 pitch. Optical surface interferometer measurements show that the gradient in the surface film of the co-diffused sample (z<300, FIG. 4B) is due to a slight rounding of the surface boundary during polishing. As shown in FIG. 5, electron microprobe measurements of step-etched (by ion milling) co-diffused samples produce a concentration profile identical to the angle milled samples, verifying that the mechanical polishing did not significantly alter the Er distribution.

From the foregoing measurements, it is concluded that limited diffusion occurs from a thin Er film into LiNbO$_3$. For an unassisted diffusion (20 hours at 1050 degrees C.), the diffusion D is much less than $3 \times 10^{-14}$ cm$^2$/s. The co-diffusion of Er with Ti, however, dramatically increased the diffusion coefficient. The measured diffusion length where D is about 5 μm corresponds to a diffusion constant D of about $9 \times 10^{-13}$ cm$^2$/s.

An optical amplifier of this invention can also operate as a laser (that is as a generator or oscillator which produces a light output in a given range, usually in the range of about 1520 to about 1560 nm). For example, mirror means are located at the inputting means and the outputting means for the signal light. When pump light is then input, spontaneous light emission from the region of Er and Ti infusion occurs as a result of optical feed back within the region caused by the mirror means. The light emission occurs through one of the mirrored ends.

EMBODIMENTS

The invention is further exemplified by the following Example wherein an embodiment of the amplifier device corresponding to FIG. 1A is prepared as follows:

(a) Preparation of Amplifier

The device of FIG. 1A consists of two directional couplers attached by a common waveguide that is diffused with Ti and Er and which functions as the amplifying region. The coupling facilitates the superpositioning of pump light relative to signal light and the proximity of these lights in the region to one another. The waveguide separation (or angle of intersection in the case of intersecting waveguides) is preferably adjusted to make approximately one coupling period for the pump light and two coupling periods for the signal light. The signal light is placed back in the original waveguide. Preparation is as follows:

Polished flat surface portions along the c-axis of a single crystal of LiNbO$_3$ are coated with a photoresist layer and dried. The photoresist is baked at 90 degrees C. for 30 minutes. The resulting photoresist layer was covered with an EBES mask which is opaque except for thin strips or slots and the assembly is exposed to a source of ultraviolet (UV) light. Since the open strips of the mask incorporate or define the profile of the amplifier structure, the photoresist material is imaged by the light source in apertured strip areas. Thereafter, the exposed photoresist layer is developed which results int he removal of all photoresist material in the so imaged areas and in the retention of the photoresist material in all non-imaged areas. The photoresist is then backed at 105 degrees C. for 30 minutes.

The resulting assembly is placed in a sputtering chamber having a vacuum of about $10^{-7}$ torr and a layer of erbium is sputtered as hereinabove described over the apertured area so as to provide a deposited erbium layer about 12 nm thick in the intersection region on the LiNbO$_3$. Without breaking the chamber vacuum, a layer of titanium is sputtered as herein described over the crystal surface. This Ti layer is about 100 nm thick. Typical width of the Er and Ti coated strips is about 3 to about 5 microns. The resulting structure is then removed from the sputtering chamber.

The residual developed photoresist layer is then removed from the (remaining) surface portions of the LiNbO$_3$ crystal. Removal is accomplished by dissolution into a solvent comprised of acetone.

Next, the resulting so layered structure is inserted into a quartz furnace, such as above described wherein an oxygen atmosphere containing water vapor is maintained at a gas flow rate of about 2 liters per minute and an atmospheric gas pressure. The water vapor is introduced into the oxygen in the manner described above. The structure is maintained in the furnace at a temperature of about 1050 degrees C. for time of about 30 hours.

The structure is then removed from the furnace, associated waveguiding structures are photolithographically defined, placed back into the sputtering chamber, and recoated with Ti using the same conditions and Ti layer thickness. The structure is then reintroduced back into the quartz furnace for about 7 to about 11 hours at the same temperature as previously described.

The structure is removed from the furnace and opposite ends of the crystal where the Ti-defined waveguides terminate are cut and polished.

Polishing blocks (pieces of single crystal LiNbO$_3$) are glued with Epotek 314 epoxy to opposed ends of the so cut substrate and the block ends are cut and polished. Thus signal light and pump light can be launched into the respective waveguide ends.

(b) Evolution

The pump light is launched into the lower arm of the left-hand directional coupler [$I_p(O)$ in FIG. 1D] and is coupled to the main waveguide, which carries the optical signal to be amplified. Both the optical signal and the pump light pass through the Er+Ti doped region, where the pump light is observed to excite the Er ions and the signal light is observed to pick up the energy and is observed to be amplified. At the second directional coupler, the remaining pump light is coupled back to the second arm of the right hand directional coupler while the signal light undergoes two coupling periods to end up staying in the original waveguide.

The pump light is launched by the use of wavelength-dependent couplers in the FIG. 1D device. Alternatively, beam light combiners and splitters (i.e., dichroic mirrors) are mounted externally but adjacent to the Er-Ti diffused region. The pump light can have any one of various wavelengths, such as 650 nm, 980 nm, 1480 nm, or the like. The absorption spectrum at these wavelengths is broad (that is, about 10–40 nm), and therefore the pump wavelength input need not be exact. The signal light output is observed to be light of about 1540 nm having approximately the spectral distribution shown in FIG. 3. This output light is observed to have a characteristic fluorescence lifetime (time constant) of about 7 microseconds.

When a relatively weak signal light is input into the Er Ti doped region, this light is observed to be amplified. As amplification increases (becomes stronger) the linewidth of the 1540 peak output appears to become narrower and the lifetime appears to become shorter.

(c) Preparation of Laser

The amplifier of Example (a) above is provided with a thin gold coating at each opposite end of this waveguide for the signal light.

In place of this gold coating, one can employ an alternating layer structure of differing dielectric constants, or one can employ a grating formed on the waveguide ends photolithographically.

Pump light is input into the resulting device. No signal light is used. Spontaneous emission of light having a wavelength in the range of about 1520 to about 1560 nm occurs.

What is claimed is:

1. An optical amplifier for light having a wavelength in a given range for use as an integrable optic device, said amplifier comprising in combination:
   (a) a crystal of lithium niobate;
   (b) a region in said crystal that is located adjacent one face thereof wherein a traveling signal light having a wavelength in the given range can travel in a light path in said region in overlapping relationship to a pump light having a wavelength that is less than about the given range;
   (c) said region being first co-diffused with erbium and titanium, and then diffused with titanium, the quantity and the distribution of said titanium being sufficient to define said light path in said region, and the quantity and the distribution of said erbium in said light path being sufficient to cause selective light absorption of said pump light by said signal light when traveling in said light path;
   (d) means for inputting said signal light into said light path, and means for outputting said signal light from said light path; and
   (e) means for inputting said pump light into said light path and for so overlapping said pump light relative to said signal light in said light path;
   so that, when said signal light and said pump light are each input into said light path, said signal light is amplified before it leaves said light path.

2. The amplifier of claim 1 wherein said given range is about 1520 to about 1560 nm and said crystal is substantially a single crystal.

3. The amplifier of claim 1 wherein said means for inputting said signal light is positioned at a first location that is adjacent one end of said light path, and said means for outputting said light path is positioned at a second location which is adjacent said light path and that also is in longitudinally spaced relationship to said first location relative to the direction of travel of said signal light.

4. The amplifier of claim 3 wherein said means for inputting and for so overlapping is positioned at a third location that is adjacent to said first location, and means for separating residual portions of said pump light from the resulting said signal light is provided, said separating means being positioned at a fourth location that is in adjacent relationship to said second location, and said signal light is separated from said residual pump light.

5. The amplifier of claim 4 wherein:
said means for inputting said signal light and said means for outputting said signal light comprises first waveguide means defined in said crystal;
said inputting and so overlapping means and said separating means comprises second waveguide means defined in said crystal; and
said first and said second waveguide means intersect and said intersection defines said region.

6. The amplifier of claim 4 wherein:
said means for inputting said signal light comprises one waveguide located at one longitudinal end of said light path,
said means for outputting said signal light comprises a second waveguide located at the opposite end of said light path,
said means for inputting and so overlapping said pumped light comprises a third waveguide that is in functional association with said one waveguide, said third waveguide being located in said functional association at a position which precedes said one longitudinal end, and
said means for separating said residual pump light comprises a fourth waveguide that is in functional association with said second waveguide, said fourth waveguide being located in said functional association at a position which follows said opposite longitudinal end.

7. The amplifier of claim 6 wherein:
said first and said third waveguides intersect, and
said second and said fourth waveguides intersect.

8. The amplifier of claim 6 wherein:
said third waveguide extends along a portion of said first waveguide in an adjacent, coupling relationship relative to said first waveguide to define said functional association, and
said fourth waveguide extends along a portion of said third waveguide in an adjacent, coupling relationship relative to said third waveguide to define said functional association.

9. The amplifier of claim 1 wherein the length of said light path is such that said signal light is amplified to a predetermined extent.

10. The amplifier of claim 1 wherein said titanium is diffused into said crystal from said face to a depth in the range of about 5 to about 12 microns, and said erbium is diffused into said crystal from said face to a depth that is in the range of about 3 to about 10 microns, and said erbium is substantially completely confined to a domain that is within the domain occupied by said titanium and that is smaller in volume than the volume of the domain occupied by said titanium at any given transverse sectional location taken across said region.

11. The amplifier of claim 6 wherein said means for inputting said signal light and also said means for outputting said signal light are in functional association with optical feedback means so that, when said means for inputting said pumped light receives pumped light, then spontaneous light emission from said region occurs, and said emission is reflected and amplified within occurs, and said emission is reflected and amplified within said region until said emission issues therefrom.

* * * * *